United States Patent
Kandasamy

(10) Patent No.: US 10,551,104 B2
(45) Date of Patent: Feb. 4, 2020

(54) METHODS AND SYSTEMS FOR AUTOMATICALLY ADAPTING TO AN INPUT POWER FOR A TRANSPORT REFRIGERATION SYSTEM

(71) Applicant: THERMO KING CORPORATION, Minneapolis, MN (US)

(72) Inventor: Vaitheeswaran Kandasamy, Barcelona (ES)

(73) Assignee: Thermo King Corporation, Minneapolis, MN (US)

( * ) Notice: Subject to any disclaimer, the term of this patent is extended or adjusted under 35 U.S.C. 154(b) by 404 days.

(21) Appl. No.: 15/502,413

(22) PCT Filed: Aug. 7, 2015

(86) PCT No.: PCT/US2015/044135
§ 371 (c)(1),
(2) Date: Feb. 7, 2017

(87) PCT Pub. No.: WO2016/022877
PCT Pub. Date: Feb. 11, 2016

(65) Prior Publication Data
US 2017/0234591 A1    Aug. 17, 2017

(30) Foreign Application Priority Data
Aug. 7, 2014  (EP) .................................... 14180156

(51) Int. Cl.
*H02K 3/00*  (2006.01)
*F25B 49/00*  (2006.01)
*B60P 3/20*  (2006.01)

(52) U.S. Cl.
CPC .............. *F25B 49/005* (2013.01); *B60P 3/20* (2013.01)

(58) Field of Classification Search
CPC ................................... B60P 3/20; F25B 49/02
See application file for complete search history.

(56) References Cited

U.S. PATENT DOCUMENTS

| 5,493,868 A | 2/1996 | Kikuiri et al. |
| 5,929,591 A | 7/1999 | Katou et al. |
| (Continued) | | |

FOREIGN PATENT DOCUMENTS

| EP | 1790921 A1 | 5/2007 |
| JP | H07-203695 A | 8/1995 |
| (Continued) | | |

OTHER PUBLICATIONS

International Search Report and Written Opinion, Internationa Patent Application No. PCT/US2015/044135, Nov. 16, 2015 (13 pages).

Primary Examiner — Muhammad S Islam
(74) Attorney, Agent, or Firm — Hamre, Schumann, Mueller, & Larson, P.C.

(57) ABSTRACT

Embodiments of systems and methods for a TRS to automatically sense a voltage level and configuration of an input AC power provided by an AC power source and automatically adapt to the input AC power being used are provided. When the voltage level of an input AC power supplied to a TRS changes, the TRS can automatically detect the change of the voltage level, and adjust a winding configuration of a compressor motor of the TRS and a voltage level of the TRS based on the detected voltage level of the input AC power.

16 Claims, 6 Drawing Sheets

(56) References Cited

U.S. PATENT DOCUMENTS

| | | | |
|---|---|---|---|
| 6,321,548 B1 * | 11/2001 | Clarke | F25B 41/062 |
| | | | 62/126 |
| 6,434,960 B1 | 8/2002 | Rousseau | |
| 7,461,516 B2 | 12/2008 | Leadingham et al. | |
| 7,628,028 B2 | 12/2009 | Tolbert, Jr. et al. | |
| 7,946,123 B2 | 5/2011 | Tolbert, Jr. et al. | |
| 2001/0045101 A1 * | 11/2001 | Graham | B60H 1/3208 |
| | | | 62/236 |
| 2006/0230768 A1 | 10/2006 | Huber et al. | |
| 2008/0041081 A1 | 2/2008 | Tolbert | |
| 2009/0266091 A1 | 10/2009 | Tolbert, Jr. et al. | |
| 2010/0275628 A1 | 11/2010 | Moseley et al. | |
| 2011/0030414 A1 | 2/2011 | Newell et al. | |

FOREIGN PATENT DOCUMENTS

| | | |
|---|---|---|
| JP | H07-111188 B2 | 11/1995 |
| KR | 1020110077802 A | 7/2011 |
| WO | 2014/047401 | 3/2014 |

* cited by examiner

METHODS AND SYSTEMS FOR AUTOMATICALLY ADAPTING TO AN INPUT POWER FOR A TRANSPORT REFRIGERATION SYSTEM

FIELD OF TECHNOLOGY

The embodiments disclosed herein relate generally to a transport refrigeration system (TRS). More specifically, the embodiments described herein relate to an automatic voltage-adapting system of a TRS.

BACKGROUND

A transport refrigeration system (TRS) is generally used to control an environmental condition such as, but not limited to, temperature and/or humidity of a transport unit. Examples of transport units include, but are not limited to, a container on a flat car, an intermodal container, a truck, a boxcar, or other similar transport unit (generally referred to as a "climate controlled transport unit"). A refrigerated transport unit is commonly used to transport perishable items such as, but not limited to, produce, frozen foods, and meat products. Generally, the refrigerated transport unit includes a transport refrigeration unit (TRU) that is attached to a transport unit to control the environmental condition of an interior space within the transport unit. The TRU can include, without limitation, a compressor, a condenser, an expansion valve, an evaporator, and fans or blowers to control the heat exchange between the air inside the interior space and the ambient air outside of the refrigerated transport unit.

SUMMARY

The embodiments described herein relate to methods and systems for automatically adapting to an input power for a transport refrigeration system (TRS).

In particular, the embodiments described herein are directed to systems and methods for a TRS to automatically sense a voltage level and configuration of an input AC power provided by an AC power source and configure an automatic voltage-adapting system of the TRS to accommodate the AC power source being used.

In some embodiments, when the voltage level of an input AC power supplied to a TRS changes, the TRS can automatically detect the change of the voltage level, and adjust a winding configuration of a compressor motor of the TRS and a voltage level of the TRS based on the detected voltage level of the input AC power.

The embodiments described herein are applicable for locations, where a power system grid voltage can change randomly within, for example, a country or continent, or if a refrigerated transport unit from one location/country to another location/country where the standby power input voltages are different. Additionally, the embodiments provided herein can monitor standby power quality and provide continuous feedback to a TRS controller.

In one embodiment, a method of automatically adapting to an input power for a transport refrigeration system (TRS) is provided. The method includes detecting an input AC power provided by an AC power source external to the TRS, determining a power voltage level of the input AC power, and changing, via a relay control circuit, a configuration of a compressor motor system based on the power voltage level of the input AC power.

In another embodiment, a method of automatically adapting to an input power for a transport refrigeration system (TRS) is provided. The method includes detecting an input AC power provided by an AC power source, stepping down a voltage level of the input AC power to generate an AC signal, and analyzing the AC signal and determining a quality of the input AC power based on the AC signal including determining whether the input AC power is under a fault condition. When the input AC power is under the fault condition, a control signal is generated and sent to stop operation of a compressor motor system. When the input AC power is not under the fault condition, the voltage level of the input AC power is determined based on the AC signal. When the voltage level is at a higher voltage level, a winding configuration of the compressor motor system is adjusted into a Star winding configuration. When the voltage level is at a lower voltage level, a winding configuration of the compressor motor system is adjusted into a Delta winding configuration.

In another embodiment, an automatic voltage-adapting system for automatically adapting to a voltage level of an input AC power supplied by an input AC power source to a transport refrigeration system (TRS) is provided. The system includes a power sensing circuit that is configured to monitor a voltage and a configuration of the input AC power, and generate a power sensing signal based on the voltage and the configuration of the input AC power. A relay control circuit is configured to receive the power sensing signal from the power sensing circuit and generate a control signal based on the power sensing signal. A relay control unit is connected to the input AC power source to provide power to a compressor motor. The relay control is configured to receive the control signal from the relay control circuit and change a configuration of a compressor motor system based on the control signal.

BRIEF DESCRIPTION OF THE DRAWINGS

Referring now to the drawings in which like reference numbers represent corresponding parts throughout.

DETAILED DESCRIPTION

The embodiments described herein relate to methods and systems for automatically adapting to an input power for a transport refrigeration system (TRS).

In particular, the embodiments described herein are directed to systems and methods for a TRS to automatically sense a voltage level and configuration of an input AC power provided by an AC power source and configure an automatic voltage-adapting system of the TRS to accommodate the AC power source being used.

The voltage and/or configuration of an input AC power supply may change from place to place. Also, some countries/regions have a dual power system. For example, in Brazil and the Caribbean Netherlands, the input AC power supply has a dual power system of (about 60 Hz, about 127/220V).

In some embodiments, when the voltage and/or configuration of an input AC power supplied to a TRS changes, the TRS can automatically detect the change of the input AC power, and adjust a winding configuration of a compressor motor of the TRS and a voltage level of the TRS based on the detected input AC power voltage.

The embodiments described herein are applicable for locations, where a power system grid voltage can change randomly within a country or continent, or if a refrigerated transport unit travels from one location/country to another location/country where the standby power input voltages are different. Additionally, the embodiments provided herein can monitor standby power quality and provide continuous feedback to a TRS controller.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of an in conditioned space of the refrigerated transport unit. The term "conditioned air" refers to air that has been treated so as to maintain a desired condition, for example, desired temperature or desired moisture control. The term "conditioned space" or "conditioned environment" refers to a space, a zone or an environment that receives the treated air.

It will be appreciated that the embodiments described herein may be used in any suitable transport unit such as a ship board container, an air cargo cabin, an over the road truck cabin, a bus, a trailer, etc.

Figure 1A:
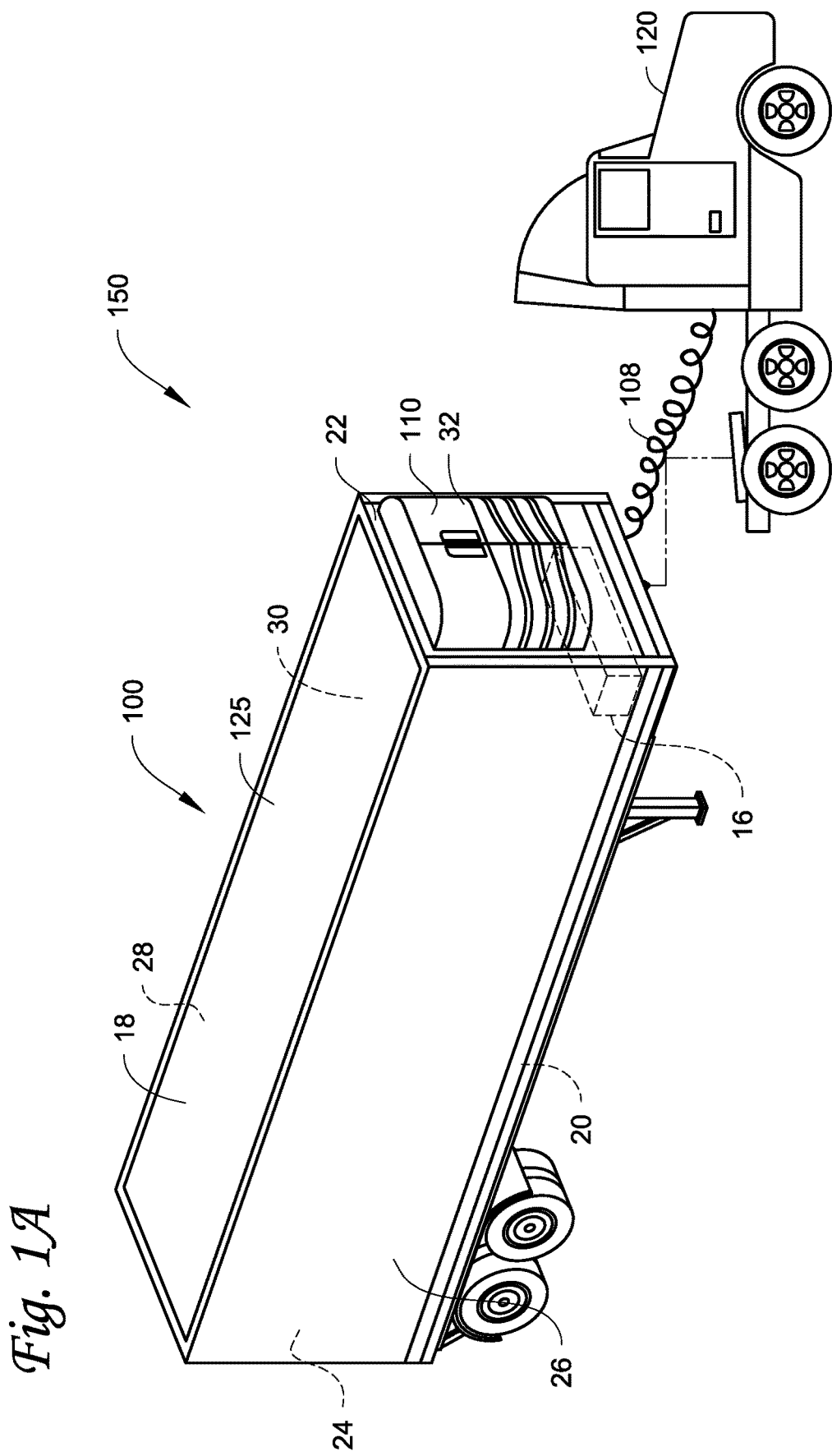
FIG. 1A illustrates a side perspective view of a refrigerated transport unit attached to a tractor, according to one embodiment.

FIG. 1A illustrates one embodiment of a TRS 150 for a refrigerated transport unit 100 that is attached to a tractor 120. The tractor 120 is configured to tow the refrigerated transport unit 100. The refrigerated transport unit 100 includes a transport unit 125 and the TRS 150. The transport unit 125 can be attached to the tractor 120 via a fifth wheel (not shown) of the tractor 120. A flexible electrical connection 108 can connect an alternator and/or a battery (not shown) of the tractor 120 to the TRS 150. In some embodiments, the flexible electrical connection 108 is one or more suzi leads.

The TRS 150 includes a TRU 110 and a generator set ("genset") 16. The TRU 110 controls refrigeration within the transport unit 125. The genset 16 is connected to the TRU 110 and supplies power the TRU 110 and other components of the TRS 150.

The transport unit 125 includes a roof 18, a floor 20, a front wall 22, a rear wall 24, and opposing sidewalls 26, 28. The TRU 110 is positioned on the front wall 22 of the transport unit 125. The TRS 150 is configured to transfer heat between a conditioned cargo space 30 and the outside environment.

As shown in FIG. 1A, the TRU 110 is enclosed in a housing 32. The TRU 110 is in communication with the cargo space 30 and controls the temperature in the cargo space 30. The TRU 110 includes a closed refrigerant circuit (not shown) that regulates various operating conditions (e.g., temperature, humidity, etc.) of the space 30 based on instructions received from a TRS controller (not shown). The refrigerant circuit can be powered by the genset 16. Generally, the compressor requires the most energy among different components of the TRS 150 and is the primary contributor of the load seen by an engine (not shown) of the genset 16.

The generator set 16 generally includes an engine (not shown), a fuel container (not shown) and a generator (not shown). The engine may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the engine. The engine may also be an engine that is configured specifically for the TRS 150. The fuel container is in fluid communication with the engine to deliver a supply of fuel to the engine.

Figure 1B:
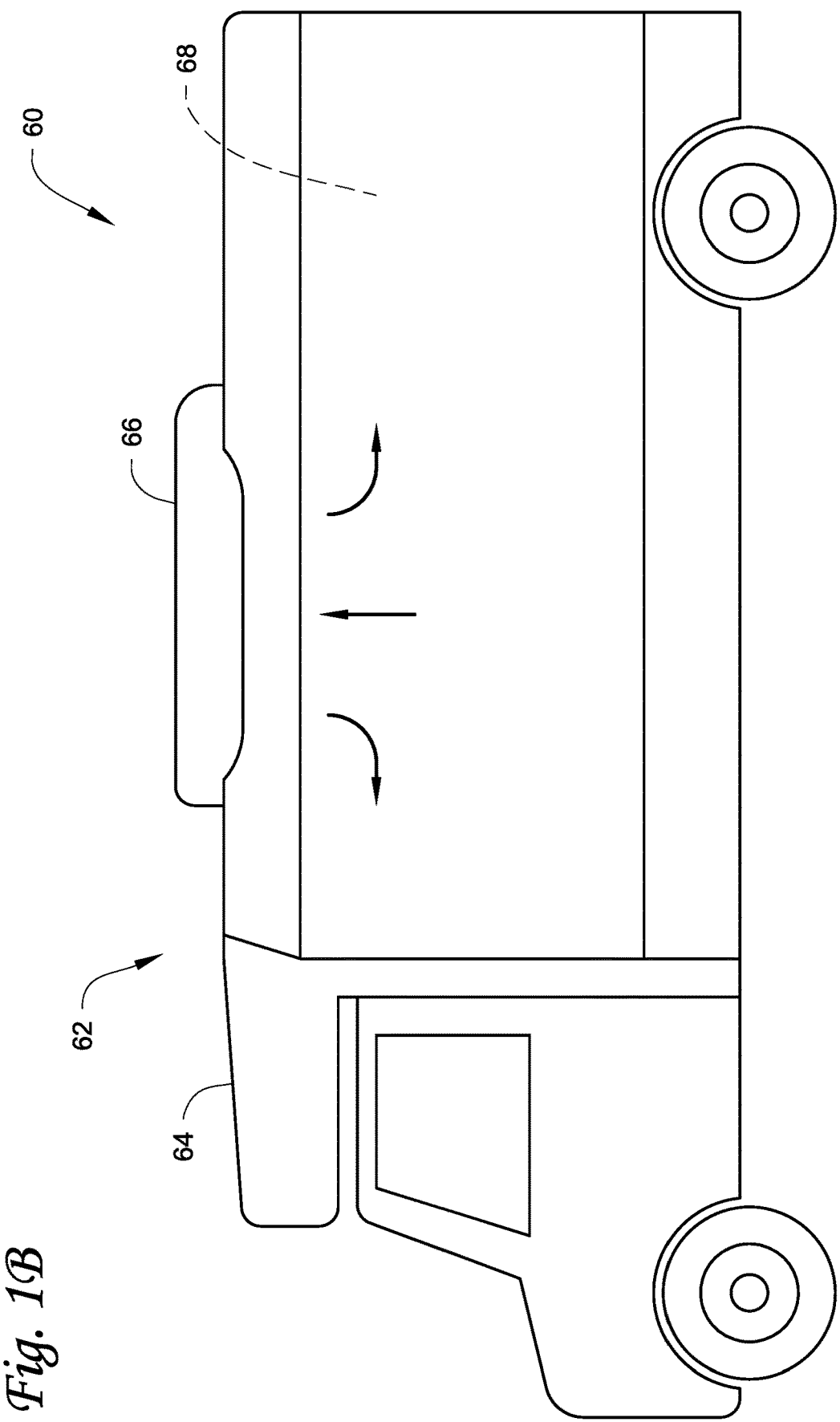
FIG. 1B illustrates a side view of a refrigerated transport unit having a TRS, according to one embodiment.

FIG. 1B illustrates a refrigerated transport unit 60 having a heating, ventilation, air conditioning, and refrigeration (HVACR) unit 62, according to one embodiment. The HVACR unit 62 includes a TRU 64 and a ventilation module 66. Air can be cooled down or heat up by the TRU 64, and circulated via the ventilation module 66 to a passenger's space 68 of the refrigerated transport unit 60. It is to be understood that the HVACR unit 62 can be used in any refrigerated transport unit and/or HVACR systems other than the specific refrigerated transport unit 60 for providing heating, ventilation, air conditioning, and refrigeration applications.

It will be appreciated that the embodiments described herein may be used in any suitable transport unit such as a ship board container, an air cargo cabin, an over the road truck cabin, etc. The TRS may be a vapor-compressor type refrigeration system, or any other suitable refrigeration systems that can use refrigerant, cold plate technology, etc.

Figure 2:
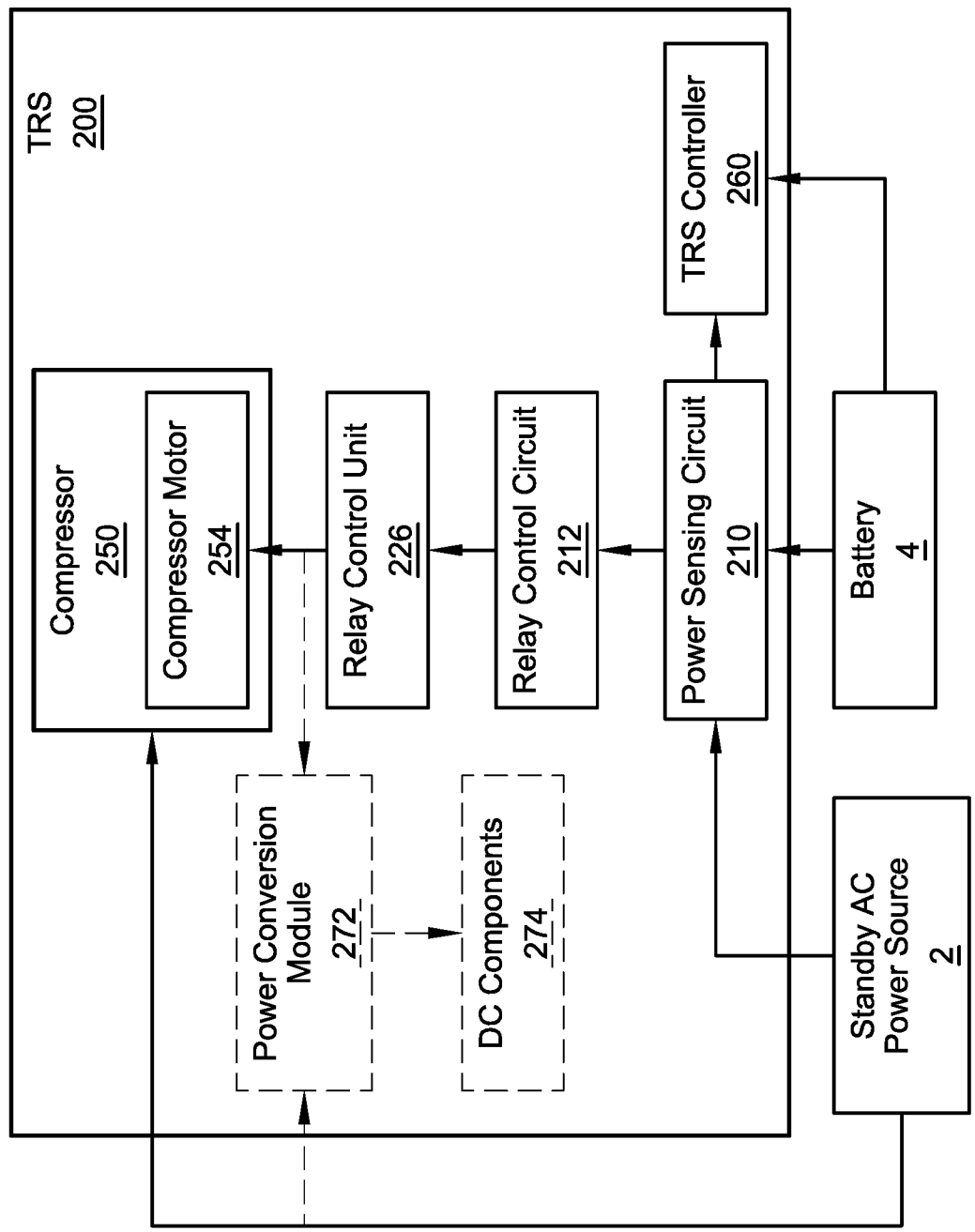
FIG. 2 illustrates a block diagram of a TRS, according to one embodiment.

FIG. 2 illustrates a block diagram of a TRS 200, according to one embodiment. The TRS 200 is connected to a standby AC power source 2 that is configured to supply an amount of input AC power with a particular voltage and configuration to the TRS 200. The voltage level and/or configuration of the input AC power can change randomly within a country or continent, or if a refrigerated transport unit (and the TRS 200) travels from one location/country to another location/country where the standby power input voltages are different. When the TRS 200 is connected to the standby AC power source 2, the TRS 200 is configured to automatically adapt to the standby AC power source 2 when the voltage level and/or configuration of an input AC power supplied to the TRS changes.

Optionally, the TRS 200 can include a power conversion module 272 connected to the relay control unit 226 and configured to convert the input AC power to a DC power for DC components or electrical loads 274 (e.g., fans, solenoids, etc.) of the TRS 200. In particular, the power conversion module 272 is configured to receive power from the standby AC power source 2 and configured to receive a control signal from the relay control unit 226. The power conversion module 272 is configured to use the control signal from the relay control unit 226 to convert the power received from the standby AC power source 2 into DC power for powering the DC components 274.

The TRS 200 includes a compressor 250 that includes a compressor motor 254 for driving the compressor 250. The standby AC power source 2 supplies an input AC power to the compressor motor 254. As discussed above, the voltage level and/or configuration of the input AC power may change. The compressor motor 254 includes one or more winding configurations. The winding configurations can be adjusted corresponding to the change of the input AC power so as to adjust a voltage level for the TRS 200 to accommodate the input AC power. In one embodiment, the winding configuration of the compressor motor 254 can be switched between a first winding configuration and a second winding configuration. The first and second winding configurations can be, for example, a Delta winding configuration and a Star winding configuration, respectively.

The TRS 200 includes a power sensing circuit 210 configured to automatically sense the input AC power. The TRS 200 further includes a relay control circuit 212 and a relay control unit 226 connected to the relay control circuit 212. The relay control circuit 212 is connected to the power sensing circuit 210 and configured to send control signal(s) to the relay control unit 226 and automatically adjust, via the relay control unit 226, the winding configuration of the compressor motor 254 according to the input AC power. In some embodiments, the power sensing circuit 210 and the relay control circuit 212 can be integrated in a single module, for example, a single printed circuit board (PCB). In some embodiments, the relay control unit 226 can include, for example, contactors having coils that can be driven by the control signal(s) from the relay control circuit 212.

The power sensing circuit 210 receives power from, for example, a battery source 4. When the standby AC power source 2 is connected to the TRS 200, the power sensing circuit 210 is configured to automatically detect the input AC power from the standby AC power source 2, analyze the input AC power, and determine the voltage level and/or configuration of the input AC power.

After determining the voltage level and/or configuration of the input AC power, the power sensing circuit 210 is configured to send signal(s) to the relay control circuit 212 based on the determined voltage level and/or configuration of the input AC power. The relay control circuit 212 processes the received signal(s) and outputs control signal(s) to the relay control unit 226. The relay control unit 226 can include, for example, components 354a, 354b, 303 and 304 in FIG. 3 to be discussed further below.

The relay control unit 226 is connected to the compressor motor 254 and configured to adjust the configuration of the compressor motor 254 based on the determined voltage and/or configuration of the input AC power. In one embodiment, the power sensing circuit 210 can send signal(s) to the relay control circuit 212 which can activate the relay control unit 226 to set the compressor motor 254 in the first winding configuration (e.g., the Delta winding configuration). In one embodiment, the power sensing circuit 210 can send signal(s) to the relay control circuit 212 which can activate the relay control unit 226 to set the compressor motor 254 in the second winding configuration (e.g., the Star winding configuration). That is, based on the determined voltage and/or configuration of the input AC power, the power sensing circuit 210, the relay control circuit 212, and the relay control unit 226 can switch the winding configuration of the compressor motor 254 between the first and second winding configurations.

The relay control unit 226 can be connected to the compressor 250 and/or some DC components of the TRS 200. In some embodiments, a standby AC voltage from the standby AC power source 2 can be fed to a step-down transformer (not shown) and a rectifier circuit (not shown) for operation of the DC components. The primary voltage of the step-down transformer can be automatically adjusted by the relay control unit 226 and the power sensing circuit 210 based on the standby AC voltage.

The power sensing circuit 210 is also connected to a TRS controller 260. The TRS controller 260 receives power from, for example, the battery source 4. In some embodiments, the power sensing circuit 210 can monitor the input AC power from the standby AC power source 2, analyze the quality of the input AC power, and continuously provide feedback to the TRS controller 260 based on results of the analysis. In some embodiments, when the AC power is lower than an operating limit tolerance, or there are unbalance phase condition(s) or missing phase(s) in the standby AC power source 2, the power sensing circuit 210 can generate a digital output communication to the TRS controller 360 as a feedback to TRS controller 360 to display related alarms according to the determined fault condition, or to stop the operation of the TRS 200.

Figure 3:
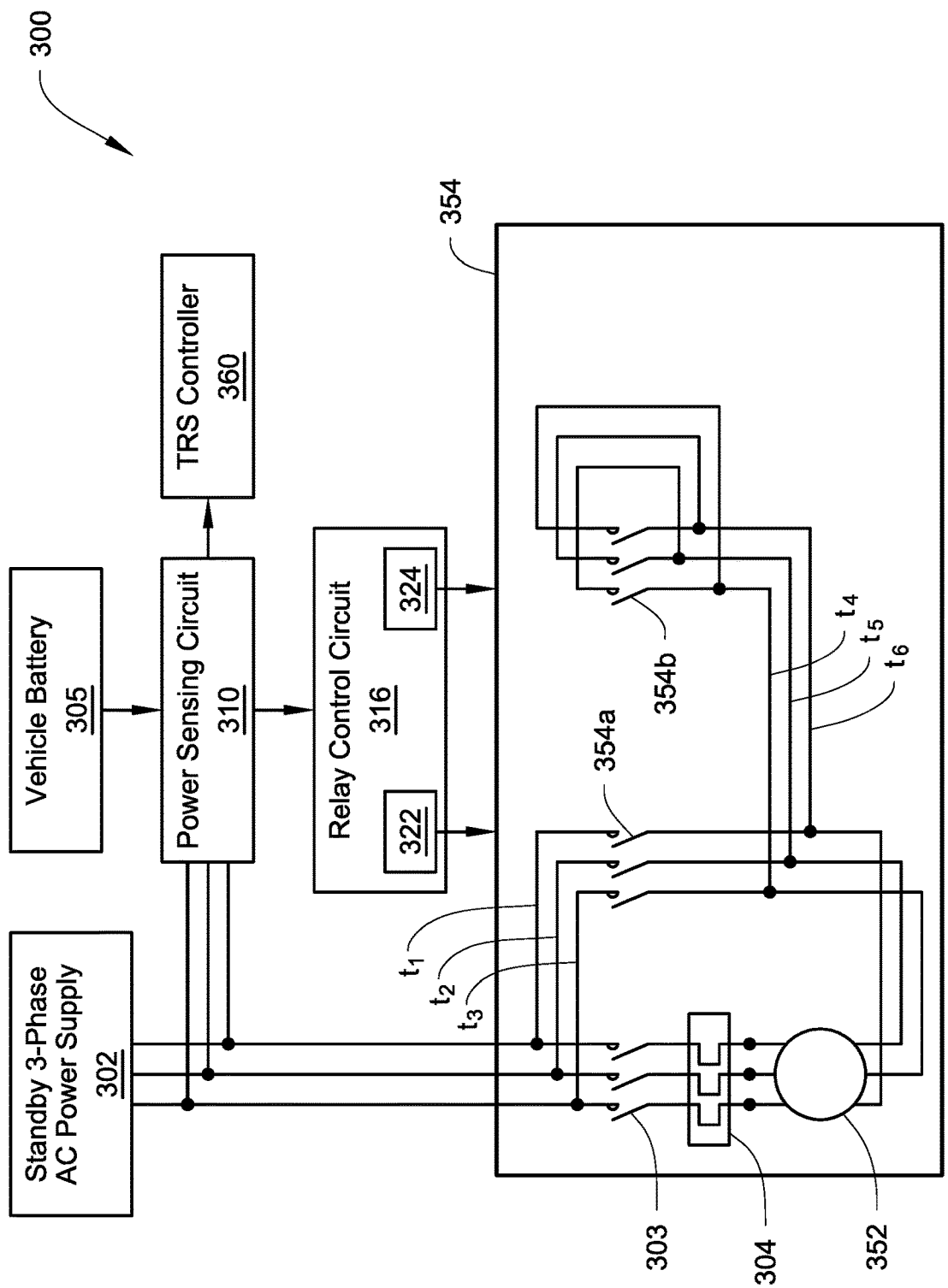
FIG. 3 illustrates a schematic diagram of an automatic voltage-adapting system of a TRS, according to one embodiment.

FIG. 3 illustrates a schematic diagram of an automatic voltage-adapting system 300 of a TRS, according to one embodiment. The system 300 includes a compressor motor system 354 for driving a compressor (not shown) of the system 300. The compressor motor system 354 includes a compressor motor 352. A standby 3-phase AC power supply 302 can be connected to the system 300 and supply an input AC power to the compressor motor 352.

The compressor motor system 354 includes six output terminals $t_{1-6}$ and main contactors 303 connected to the standby 3-phase AC power supply 302. The first set of terminals $t_{1-3}$ is connected to a first set of contactors 354a. The second set of terminals $t_{4-6}$ is connected to a second set of contactors 354b. The contactors 354a and 354b are disposed at one end of the compressor motor 352. The main contactors 303 are disposed at another end of the compressor motor 352. The main contactors 303 and the first/second contactors 354a or 354b can be closed to form a closed circuit for the winding configuration of the compressor motor system 354. The main contactors 303 can be opened to stop the operation of the compressor motor 352 and the associated compressor (not shown).

When the first set of contactors 354a and the main contactors 303 are closed, the compressor motor 352 is in a first winding configuration (e.g., a Delta winding configuration). When the second set of contactors 354b and the main contactors 303 are closed, the compressor motor 352 is in a second winding configuration (e.g., a Star winding configuration). The winding configuration of the compressor motor 352 can be switched between the first winding configuration (e.g., the Delta winding configuration) and the second winding configuration (e.g., the Star winding configuration) by closing/opening the first set of contactors 354a or the second set of contactors 354b.

A thermal overload 304 is disposed between the main contactors 303 and the compressor motor 352 for protecting the compressor motor 352. Configurations and functions of a thermal overload are known in the art.

The system 300 further includes a power sensing circuit 310 connected to the standby 3-phase AC power supply 302, a TRS controller 360, and a relay control circuit 316. The relay control circuit 316 includes a first relay 322 and a second relay 324. In some embodiments, the relay control circuit 316 can be integrated with the power sending circuit 310 in a single module, for example, a single printed circuit board (PCB).

The power sensing circuit 310 is configured to receive an operating DC voltage from, for example, a vehicle battery

305. The operating DC voltage can be, for example, 9 to 32 V. When the standby 3-phase AC power supply 302 is connected to the system 300, the power sensing circuit 310 is configured to automatically detect the input AC power, analyze the input AC power, and determine the voltage level and/or configuration of the input AC power. The power sensing circuit 310 then outputs control signal(s) to the relay control circuit 316 to drive the first relay 322 and/or the second relay 324 based on the determined voltage and/or configuration of the input AC power.

The first set of contactors 354*a* and the second set of contactors 354*b* each can include coils (not shown). The first relay 322 and the second relay 324 of the relay control circuit 316 can be connected to the coils of the first set of contactors 354*a* and the coils of the second set of contactors 354*b*, respectively, via, for example, an electrical harness. In one embodiment, the first and second relays 322 and 324 each can include an electromagnetic mechanism such as for example, a coil. In the embodiments described herein, a relay such as, for example, the first and second relays 322 and 324, can have a relatively smaller working current than a contactor such as, for example, the contactors 354*a-b*. In one embodiment, the working current of the first and second relays 322, 324 can be about 100 milliamps up to about 5 Amps. In another embodiment, the working current of the first and second relays 322, 324 can be about 100 milliamps up to about 200 milliamps. In some embodiments, the working current of the first and second set of contactors 354*a, b* can be about 2 up to about 20 Amps. However, it will be appreciated that the working current of the first and second relays 322, 324 and the first and second set of contactors 354*a, b* can vary based on a variety of factors including, for example, the specific configuration and capacity of a TRS in which the automatic voltage-adapting system 300 is provided. In particular, it will be appreciated that the working current of the first and second relays 322, 324 and the first and second set of contactors 354*a, b* can vary based on the specific configuration and capacity of the compressor of the compressor motor system 354, among other factors.

In some embodiments, based on the determined voltage level and/or configuration of the input AC power, the power sensing circuit 310 can send power sensing signal(s) to the relay control circuit 316. The relay control circuit 316 can process the received power sensing signal(s) and output control signal(s) to drive the first relay 322 and the second relay 324 for opening/closing contactors, such as, for example, the first set of contactors 354*a*, the second set of contactors 354*b*, the main contactors 303, etc., so as to switch the compressor motor 352 between the first winding configuration (e.g., the Delta winding configuration) and the second winding configuration (e.g., the Star winding configuration).

In some embodiments, when the power sensing circuit 310 determines that the voltage of the input AC power is at a first voltage level, the power sensing circuit 310 can send signal(s) to the relay control circuit 316. The relay control circuit 316 can process the received signal(s) and output control signal(s) to activate the first and second relays 322 and 324 to close the first set of contactors 354*a* and open the second set of contactors 354*b*. The winding configuration of the compressor motor 352 is then set in the first winding configuration (e.g., the Delta winding configuration). When the input AC power changes and the voltage level of the input AC power is at a second voltage level higher than the first voltage level, the power sensing circuit 310 can automatically detect the change and send signal(s) to the relay control circuit 316. The relay control circuit 316 then outputs control signal(s) based on the received signal(s) to activate the first and second relays 322 and 324 to open the first set of contactors 354*a* and close the second set of contactors 354*b*. The winding configuration of the compressor motor 352 is then set in the second winding configuration (e.g., the Star winding configuration) based on the changed voltage level of the input AC power.

Figure 4:
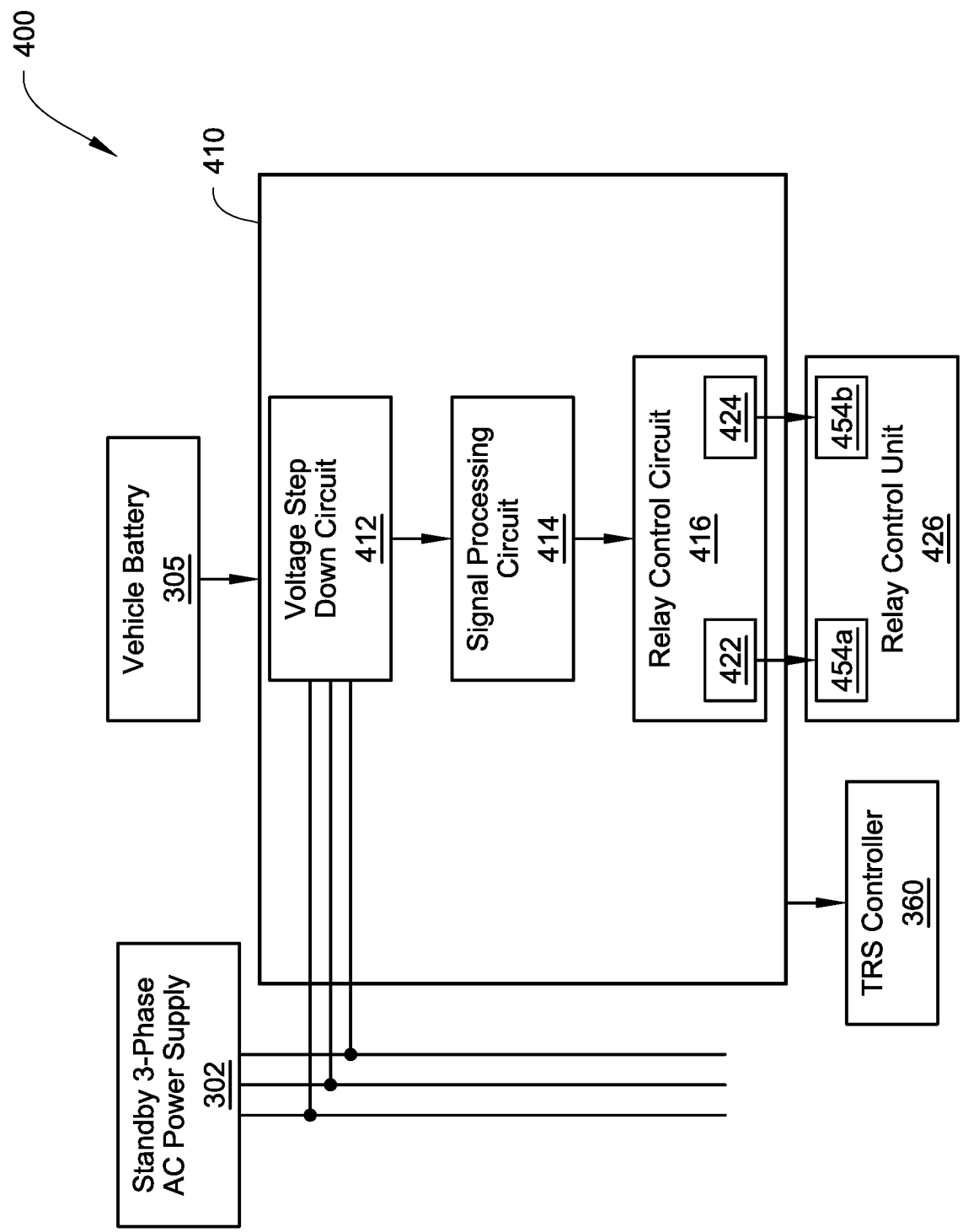
FIG. 4 illustrates a schematic diagram of an automatic voltage-adapting system of a TRS, according to another embodiment.

FIG. 4 illustrates an automatic voltage-adapting system 400 including a power sensing circuit 410 and a relay control unit 426, according to another embodiment. In the embodiment shown in FIG. 4, a relay control circuit 416 is a part of the power sensing circuit 410. The power sensing circuit 410 includes a voltage step down circuit 412, a signal processing circuit 414, and the relay control circuit 416. The relay control circuit 416 includes a digital output control circuit that includes, for example, a first relay 422 and a second relay 424. In some embodiments, a digital output control circuit of the relay control circuit 416 can receive the control signals from the signal processing circuit 414, amplify the control signal, and output the control signals to the relay control unit 426. In some embodiments, the components of the power sensing circuit 410 can be disposed on a single printed circuit board (PCB).

The voltage step down circuit 412 is configured to sense the input AC power from the standby 3-phase AV power supply 302, step-down the voltage of the sensed AC power to an AC signal with a predetermined low voltage level, and feed the AC signal to the signal processing circuit 414. In some embodiments, the predetermined low voltage level can be a voltage level between, for example, about 10-14 V AC depending on the design of the voltage step down circuit 412. The signal processing circuit 414 is configured to receive the AC signal, analyze the AC signal, determine the quality of the input AC power based on results of the analysis, determine the voltage level and configuration of the input AC power voltage, and output control signals to the digital output control circuit of the relay control circuit 416. The digital output control circuit of the relay control circuit 416 is configured to receive control signals from the signal processing circuit 414 so that one or both of the first and second relays 422, 424 can be activated.

In some embodiments, the signal processing circuit 414 can analyze the received AC signal to determine whether the input AC power is under a fault condition. The fault condition of the input AC power can include, for example, the voltage of the input AC power being under a low voltage limit or above a high voltage limit, the input AC power having a missing phase and/or reverse phase condition, the input AC power having a voltage unbalance, etc. In one embodiment, the signal processing circuit 414 can compare features of the input AC power with preset standards (e.g., preset level of voltage tolerances) to tell whether the input AC power is under a fault condition.

In one embodiment, when the signal processing circuit 414 determines that the input AC power is under one of the fault conditions, the signal processing circuit 414 can send a signal to the TRS controller 360 to stop the operation of a compressor motor such as, for example, the compressor motor 352 as shown in FIG. 3 and the associated compressor (not shown). When the signal processing circuit 414 detects that the fault condition is removed, the signal processing circuit 414 can send a signal to the TRS controller 360 to enable the operation of the compressor motor. This can preclude reverse phase connections of three phase AC input from the standby 3-phase AC power supply 302 and preclude the operation of the compressor motor in a wrong direction rotation.

In another embodiment, when the signal processing circuit 414 determines that the input AC power is under a fault condition, the signal processing circuit 414 can provide digital output communication to the TRS controller 360 to display related alarms according to the determined fault condition.

The relay control unit 426 includes a first contactor 454a and a second contactor 454b that can be, for example, the first set of contactors 354a and the second set of contactors 354b in FIG. 3, respectively. The first relay 422 and the second relay 424 of the relay control circuit 416 are connected to and drive coils of the first contactor 454a and coils of the second contactor 454b of the relay control unit 426, respectively.

In some embodiments, the relay control unit 426 can be connected to contactors (not shown) which can provide power to a compressor motor such as, for example, the compressor motor 352 in FIG. 3. In some embodiments, the relay control unit 426 can be connected to some DC components of the system 400 and provide power to the DC components via, for example, a standby power supply step-down transformer (not shown).

Figure 5:
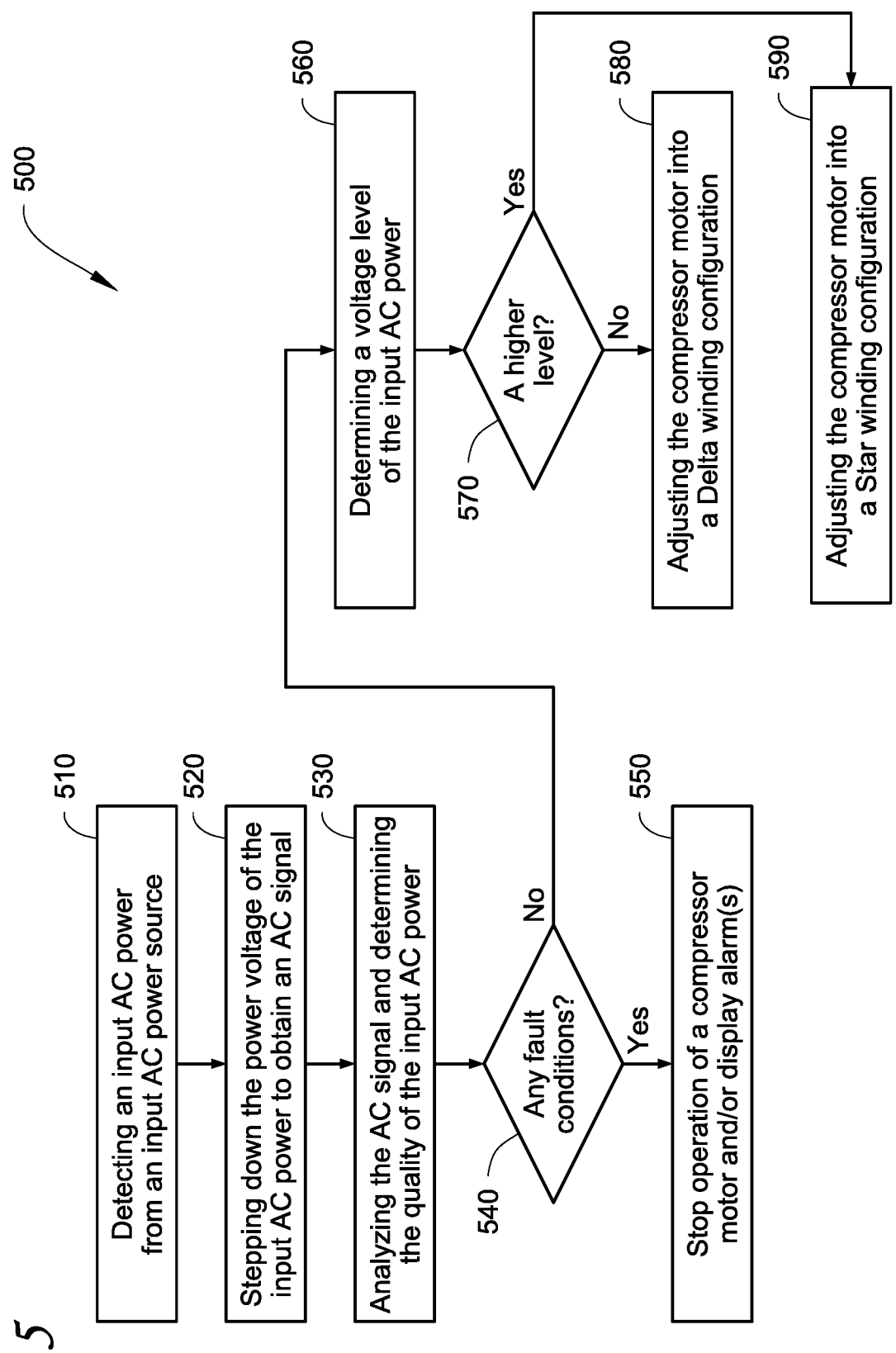
FIG. 5 illustrates a flow diagram of a method for automatically adapting to an input power for a TRS when a different input AC power supply is detected, according to one embodiment.

FIG. 5 illustrates a flow diagram of a method 500 for automatically adapting to an input power for a TRS when a different standby input AC power voltage is detected, according to one embodiment. The method 500 is illustrated as performed by an automatic voltage-adapting system such as the system 400 as shown in FIG. 4 for the TRS 400. It is to be understood that the method 500 can also be performed by other suitable automatic voltage-adapting systems.

At 510, the power sensing circuit 410 automatically detects an input AC power supplied by the standby AC power source 302. The method 500 then proceeds to 520.

At 520, the power sensing circuit 410 steps down the power voltage of the input AC power to obtain an AC signal with a predetermined lower voltage level. In some embodiments, the voltage level can be step down by a voltage step down circuit such as the voltage step down circuit 412 shown in FIG. 4 to obtain an AC signal with a predetermined lower voltage level. The method 500 then proceeds to 530.

At 530, the power sensing circuit 410 analyzes the AC signal and determines the quality of the input AC power. In some embodiments, the quality of the input AC power can be analyzed and determined by a signal processing circuit such as the signal processing circuit 414 shown in FIG. 4. The method 500 then proceeds to 540.

At 540, the power sensing circuit 410 determines via, for example, the signal processing circuit 414, whether the input AC power is under a fault condition. If the input AC power is under a fault condition, the method 500 proceeds to 550. If the input AC power is not under a fault condition, the method 500 proceeds to 560.

At 550, when the input AC power is under a fault condition, the power sensing circuit 410 sends a signal to the TRS controller 360 to stop the operation of a compressor motor such as, for example, the compressor motor 254 and the TRS, and/or to display alarm(s) in a display, for example, a human-machine interaction (HMI) display.

At 560, when the input AC power is not under a fault condition, the power sensing circuit 410 determines the voltage level of the input AC power. The method 500 then proceeds to 570.

At 570, the power sensing circuit 410 determines whether the voltage level of the input AC power is a lower level or a higher level. If the voltage level is the lower level, the method 500 proceeds to 580. If the voltage level is the higher level, the method 500 proceeds to 590. In one embodiment, the lower level can be about 230 V AC±10%. In some embodiments, the higher level can be about 400 V AC±10%. However, the higher level and the lower level can be set based on the desired dual voltage requirements, the geographic location of the automatic voltage-adapting system, etc.

At 580, when the voltage level of the input AC power is the lower level, the power sensing circuit 410 adjusts the winding configuration of the compressor motor into a Delta winding configuration. In some embodiments, the relay control circuit 416 can send control signal(s) to the relay control unit 426, and the first second relay 422 of the relay control circuit 416 can drive coils of the first contactor 454a of the relay control unit 426 to set the winding configuration of the compressor motor 352 into the Delta winding configuration.

At 590, when the voltage level of the input AC power is the high level, the power sensing circuit 410 adjusts the winding configuration of the compressor motor 254 into a Star winding configuration. In some embodiments, the relay control circuit 416 can send control signal(s) to the relay control unit 426, and the second relay 424 of the relay control circuit 416 can drive coils of the second contactor 454b of the relay control unit 426 to set the winding configuration of the compressor motor 352 into the Star winding configuration.

Aspects:

It is noted that any of aspects 1-15 below can be combined with each other.

Aspect 1. A method of automatically adapting to an input power for a transport refrigeration system (TRS), the method comprising:

detecting an input AC power provided by an AC power source external to the TRS;

determining a power voltage level of the input AC power; and changing, via a relay control circuit, a configuration of a compressor motor system based on the power voltage level of the input AC power.

Aspect 2. The method of aspect 1, wherein changing the configuration comprises changing a winding configuration for providing power for a compressor motor.

Aspect 3. The method of any of aspects 1-2, wherein the detecting the input AC power comprises stepping down, via a voltage step down circuit, a voltage level of the input AC power to generate an AC signal, and sending the AC signal to a signal processing circuit.

Aspect 4. The method of any of aspects 1-3, further comprising analyzing, via the signal processing circuit, the AC signal to determine a quality of the input AC power supply and generate a power quality signal.

Aspect 5. The method of aspect 4, further comprising sending the power quality signal to a TRS controller based on the quality of the input AC power.

Aspect 6. The method of any of aspects 2-5, wherein the changing the winding configuration includes changing the winding configuration to a Delta winding configuration when the power voltage level of the input AC power is determined to be a lower level.

Aspect 7. The method of any of aspects 2-5, wherein the changing the winding configuration includes changing the winding configuration to a Star winding configuration when the power voltage level of the input AC power is determined to be a higher level.

Aspect 8. A method of automatically adapting to an input power for a transport refrigeration system (TRS), the method comprising:

detecting an input AC power provided by an AC power source;
stepping down a voltage level of the input AC power to generate an AC signal;
analyzing the AC signal and determining a quality of the input AC power based on the AC signal, including determining whether the input AC power is under a fault condition;
when the input AC power is under the fault condition, generating and sending a control signal to stop operation of a compressor motor system;
when the input AC power is not under the fault condition, determining the voltage level of the input AC power based on the AC signal;
when the voltage level is at a higher voltage level, adjusting a winding configuration of the compressor motor system into a Star winding configuration; and
when the voltage level is at a lower voltage level, adjusting a winding configuration of the compressor motor system into a Delta winding configuration.

Aspect 9. An automatic voltage-adapting system for automatically adapting to a voltage level of an input AC power supplied by an input AC power source to a transport refrigeration system (TRS), the system comprising:
a power sensing circuit, configured to monitor a voltage and a configuration of the input AC power, and generate a power sensing signal based on the voltage and the configuration of the input AC power;
a relay control circuit, configured to receive the power sensing signal from the power sensing circuit and generate a control signal based on the power sensing signal; and
a relay control unit being connected to the input AC power source to provide power to a compressor motor, the relay control configured to receive the control signal from the relay control circuit and change a configuration of a compressor motor system based on the control signal.

Aspect 10. The automatic voltage-adapting system of aspect 9, wherein the configuration of the compressor motor system includes a winding configuration for providing power to a compressor motor, the winding configuration is switchable between a Delta winding configuration and a Star winding configuration.

Aspect 11. The automatic voltage-adapting system of aspect 10, wherein when the power sensing circuit determines a voltage level of the input AC power to be at a higher voltage level, the relay control circuit adjusts the winding configuration into the Star winding configuration, and
when the power sensing circuit determines a voltage level of the input AC power to be at a lower voltage level, the relay control circuit adjusts the winding configuration into the Delta winding configuration.

Aspect 12. The automatic voltage-adapting system of any of aspects 9-11, wherein the power sensing circuit including:
a voltage step down circuit, configured to step down a voltage level of the input AC power to generate an AC signal; and
a signal processing circuit, configured to receive the AC signal and analyze the AC signal to determine the voltage level and the quality of the input AC power.

Aspect 13. The automatic voltage-adapting system of any of aspects 9-12, wherein the relay control circuit includes a digital output control circuit configured to receive the power sensing signal from the signal processing circuit, amplify the power sensing signal to generate the control signal, and output the control signal to the relay control unit.

Aspect 14. The automatic voltage-adapting system of any of aspects 10-13, wherein the relay control circuit includes first and second relays, the relay control unit includes first and second sets of contactors, and the first and second relays are configured to drive coils of the first and second sets of contactors, respectively, to switch the winding configuration between the Delta winding configuration and the Star winding configuration.

Aspect 15. The automatic voltage-adapting system of any of aspects 9-14, wherein the power sensing circuit and the relay control circuit are integrated in a single printed circuit board (PCB).

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A method of automatically adapting to an input power for a transport refrigeration system (TRS), the method comprising:
detecting an input AC power provided by a power system grid AC power source external to the TRS;
determining a power voltage level of the input AC power from the power system grid AC power source; and
changing, via a relay control circuit, a configuration of a compressor motor system based on the power voltage level of the input AC power from the power system grid AC power source.

2. The method of claim 1, wherein changing the configuration comprises changing a winding configuration for providing power for a compressor motor.

3. The method of claim 1, wherein the detecting the input AC power comprises stepping down, via a voltage step down circuit, a voltage level of the input AC power to generate an AC signal, and sending the AC signal to a signal processing circuit.

4. The method of claim 1, further comprising analyzing, via the signal processing circuit, the AC signal to determine a quality of the input AC power supply and generate a power quality signal.

5. The method of claim 4, further comprising sending the power quality signal to a TRS controller based on the quality of the input AC power.

6. The method of claim 2, wherein the changing the winding configuration includes changing the winding configuration to a Delta winding configuration when the power voltage level of the input AC power is determined to be a lower level.

7. The method of claim 2, wherein the changing the winding configuration includes changing the winding configuration to a Star winding configuration when the power voltage level of the input AC power is determined to be a higher level.

8. A method of automatically adapting to an input power for a transport refrigeration system (TRS), the method comprising:
detecting an input AC power provided by an AC power source;
stepping down a voltage level of the input AC power to generate an AC signal;
analyzing the AC signal and determining a quality of the input AC power based on the AC signal, including determining whether the input AC power is under a fault condition;

when the input AC power is under the fault condition, generating and sending a control signal to stop operation of a compressor motor system;

when the input AC power is not under the fault condition, determining the voltage level of the input AC power based on the AC signal;

when the voltage level is at a higher voltage level, adjusting a winding configuration of the compressor motor system into a Star winding configuration; and when the voltage level is at a lower voltage level, adjusting a winding configuration of the compressor motor system into a Delta winding configuration.

9. An automatic voltage-adapting system for automatically adapting to a voltage level of an input AC power supplied by an input power system grid AC power source to a transport refrigeration system (TRS), the system comprising:

a power sensing circuit, configured to monitor a voltage and a configuration of the input AC power from the input power system grid AC power source, and generate a power sensing signal based on the voltage and the configuration of the input AC power from the input power system grid AC power source;

a relay control circuit, configured to receive the power sensing signal from the power sensing circuit and generate a control signal based on the power sensing signal; and a relay control unit being connected to the input power system grid AC power source to provide power to a compressor motor, the relay control configured to receive the control signal from the relay control circuit and change a configuration of a compressor motor system based on the control signal.

10. The automatic voltage-adapting system of claim 9, wherein the configuration of the compressor motor system includes a winding configuration for providing power to a compressor motor, the winding configuration is switchable between a Delta winding configuration and a Star winding configuration.

11. The automatic voltage-adapting system of claim 10, wherein when the power sensing circuit determines a voltage level of the input AC power to be at a higher voltage level, the relay control circuit adjusts the winding configuration into the Star winding configuration, and when the power sensing circuit determines a voltage level of the input AC power to be at a lower voltage level, the relay control circuit adjusts the winding configuration into the Delta winding configuration.

12. The automatic voltage-adapting system of claim 9, wherein the power sensing circuit including:

a voltage step down circuit, configured to step down a voltage level of the input AC power to generate an AC signal; and a signal processing circuit, configured to receive the AC signal and analyze the AC signal to determine the voltage level and the quality of the input AC power.

13. The automatic voltage-adapting system of claim 9, wherein the relay control circuit includes a digital output control circuit configured to receive the power sensing signal from the signal processing circuit, amplify the power sensing signal to generate the control signal, and output the control signal to the relay control unit.

14. The automatic voltage-adapting system of claim 10, wherein the relay control circuit includes first and second relays, the relay control unit includes first and second sets of contactors, and the first and second relays are configured to drive coils of the first and second sets of contactors, respectively, to switch the winding configuration between the Delta winding configuration and the Star winding configuration.

15. The automatic voltage-adapting system of claim 9, wherein the power sensing circuit and the relay control circuit are integrated in a single printed circuit board (PCB).

16. The method of claim 8, wherein the AC power source is a power system grid AC power source.

* * * * *